Patented May 23, 1939

2,159,678

UNITED STATES PATENT OFFICE 2,159,678

PREPARATION OF AN ENZYMIC MATERIAL

Alfred Schultz and Lawrence Atkin, New York, and Charles N. Frey, Scarsdale, N. Y., assignors to Standard Brands Incorporated, New York, N. Y., a corporation of Delaware No Drawing. Application July 7, 1936, Serial No. 89,480

7 Claims. (Cl. 195—66)

The invention relates to a procedure for the preparation of an enzymic material, more particularly it relates to the production of enzymes capable of liquefying starch and starch containing materials and includes correlated improvements and discoveries whereby enzymic liquefaction of starch is enhanced.

It is an object of the invention to provide a procedure in accordance with which an enzymic material having high starch liquefying power may be prepared.

Another object of the invention is to provide for the production of a starch liquefying enzyme through the utilization of readily available materials and a prepared wort with control of various factors as pH, temperature and depth of wort or nutrient medium and which procedure may be efficiently and economically practised commercially.

A further object of the invention is directed to the production of a solution containing starch liquefying enzymes from various sources, especially bacterial sources with the employment of a wort prepared from a cereal meal. The invention also provides a method whereby the enzymes may be produced either in a continuous or an intermittent manner.

A particular object is the provision of a liquid enzymic preparation which has a high starch liquefying power, remains relatively stable during handling and in storage, and with respect to which various metals, as aluminum and tin, are not toxic. There is also provided an enzyme that may be easily isolated and with which reproducible results may be obtained with maintenance of the culture and of its strength.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practise of the invention, a starch liquefying enzymic material may be produced by first preparing a nutrient medium or wort from a suitable cereal meal, as soy bean and cotton seed in the following manner: digesting with a mineral acid, for example, sulfuric acid, filtering, placing the filtrate so obtained in shallow containers which may be trays having a depth of about 0.5 centimeter, sterilizing by subjecting to the influence of flowing steam, preferably for about thirty minutes on two successive days, and adjusting the pH value to about 5.85. This wort is now inoculated with a "pony" of a bacterial culture, e. g., of the type Bacillus mesentericus producing starch liquefying enzymes and incubated at a suitable temperature in the presence of air until a maximum growth or concentration is reached.

When utilizing a wort prepared from soy meal the incubating temperature may be about 30° C. and the maximum value is usually reached after a period of several days, specifically about 48 to 72 hours. Bacteria present may be removed by a filtration procedure, but preferably they are separated by transferring the whole mixture to a container and permitting to stand. The bacteria will float to the top of the liquid in such a manner that a clear product may be drawn off from underneath. A fraction consisting of from 20 to 25% of the starch liquefying enzyme may be lost in this manner, but a considerable part of such loss may be avoided by washing the bacteria. It will be realized that such a washing will entail a dilution of the enzymic material. Further, the process may be carried out so that the receptacles in which the starch liquefying enzyme is produced may be emptied without danger of contamination, and in such instance the fresh wort may be admitted and the enzyme produced without an inoculation other than that which is effected by the organisms adhering to the receptacles. In the event that contamination of the organism does not take place such procedure may be followed for a considerable time, if not indefinitely.

As an illustrative embodiment of a manner in which the invention may be practised, the following description is presented:

A nutrient medium is prepared by mixing one part of soy meal with about five parts of water to which sulfuric acid is added in a quantity which is about 5% by weight of the soy meal. This mixture is now heated, preferably in a non-corrodible receptacle, as a glass lined vessel, at a steam pressure of about 20 lbs. per sq. inch for a period of about four hours. The mash is then neutralized while hot until a definitely blue reaction is obtained with neutral litmus; that is, pH of 6.5 to 7.0 after which it is filtered preferably while hot. The hot filtrate is placed in suitable shallow receptacles and sterilized by heating in flowing steam for thirty minutes on two successive days. The sterilization should be carried out in a manner such that the reaction of the cooled final medium is practically neutral to neutral litmus. This is at a pH value of about 5.85. The pH value may be adjusted to about 5.85 through the utilization of a suitable acid or alkali, for example, sulfuric acid or sodium hydroxide.

The wort prepared in the foregoing manner is inoculated with a "pony" of about 5% of the final volume. This "pony" may consist of a 48 hour growth of an organism of the type Bacillus mesentericus which has been prepared in a suitable number of glass flasks. These flasks may be of a convenient size, and a proportion giving satisfactory results is a wort content about one-fourth the content of the flask. The medium in the shallow growing vessels is adjusted to a depth of about 0.5 centimeter and incubation is carried out at a temperature controlled to about 30° C. A sufficient amount of air or other oxygen-containing gas is admitted to facilitate the growth of the organism and a substantially maximum enzyme concentration will have been reached after a period of about 72 hours.

In the foregoing procedure, other meals than soy bean meal may be used, for example, cotton seed, and it will be realized that the conditions pertaining to acid digestion, temperature conditions during incubation and duration thereof will vary according to the cereal material serving for the preparation of the wort.

The procedure hereindescribed and the enzymic preparation obtained are characterized by factors hereinafter given. At the end of the period of incubation, the contents of the vessel may be withdrawn and fresh wort added directly without any additional inoculation by cultured organisms. The vessel may thus serve for an extended period without repeated inoculations and the enzymic material obtained does not decrease in its ability to liquefy starch. Further, neither the bacteria nor the produced enzymes are effected by the presence of various metals, as aluminum and tin, since it was found that iron vessels coated with aluminum or with tin might serve for the process.

The enzymic material may be admixed with other enzyme preparations, such as those containing diastatic enzymes without any deterioration either on the part of the starch liquefying enzyme or of the diastatic enzymes with which it is admixed, provided the pH value is about 6.1. When a soy bean wort is made into agar slants by the addition of about 3% of powdered agar thereto and the reaction maintained blue with respect to neutral litmus a luxurious growth of the organism was obtained after an incubation period of 24 to 48 hours. In the event that the depth of the inoculated layer, the temperature and other conditions are maintained, the yield of enzyme is proportional to the Balling of the wort; that is, if the wort is diluted with an equal volume of water, the yield of enzyme will be reduced to about one-half. Further, it was found that under the conditions hereinbefore described a maximum yield of enzyme was obtained after about 48 to 72 hours of incubation. This period, however, may be modified by the initial pH value of the medium, by the depth of wort in the vessel, the area exposed, the temperature, etc.

A comparative analysis of a soy meal wort and of an enzymic preparation obtained therefrom gave the following results:

|  | Wort | Enzyme preparation |
| --- | --- | --- |
| Solids gms./100 cc | 9.75 | 8.03 |
| Total N gms./100 cc | 0.54 | 0.44 |
| "MgO" N gms./100 cc | 0.04 | 0.12 |
| Red. sugars (as invert) gms./100 cc | 1.81 | 0.84 |
| Ash gms./100 cc |  |  |

The increase in magnesium oxide nitrogen in the enzyme preparation is to be particularly noted and it may be added that liberation of ammonia is shown because of the fact that the air above the growing bacteria gave a blue reaction with neutral litmus.

The wort may be replaced at least to one-half its amount by a peptonized protein composition, such as a 10% solution of Witte's peptone. The gas requirement of the organisms was demonstrated by placing the organisms in various atmospheres, and the following results were obtained: Nitrogen atmosphere, practically no growth; normal atmosphere, sealed, medium growth, no change in pressure except after 36 hours when a slight pressure was apparent; normal atmosphere, sealed and potassium hydroxide present—medium growth, rapid development of reduced pressure, but decreasing after 36 hours, finally a slight pressure was apparent; and normal atmosphere, cotton stopper, heavy growth. The indications therefrom with respect to the organism are that it is an aerobe; carbondioxide is liberated during growth; pH optimum conditions when utilizing a soy meal wort lie between pH 5.5 and 6.0 initial acidity; the medium becomes quite alkaline, pH 8.8 during growth, and, depth of the medium for enzyme production at 30° C. should be about 0.5 cm. A maximum yield of the enzyme under the prescribed conditions is obtained in from 48 to 72 hours, and the enzyme produced has a high starch liquefying power.

The initial pH may be adjusted either before or after sterilization, but if adjusted before particular care is to be exercised since the effect of heating is to make the medium more acid, i. e., decreases the pH value.

The sensitivity of the enzyme with respect to initial pH is shown by the following:

| Initial pH | Liquefying power after 72 hours incubation |
| --- | --- |
| 5.2 | 0 |
| 5.55 | 1,550 |
| 5.85 | 1,700 |
| 6.18 | 1,320 |
| 6.65 | 1,170 |

The pH values were adjusted and the organism grown with respect to a wort of 10.4° Balling. As above indicated, a change in Balling will bring about a proportional change in liquefying power, or enzyme yield.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A process for the preparation of a starch liquefying enzymic material which comprises preparing a nutrient medium from a cereal meal, sterilizing, adjusting the acidity prior to inoculation to a pH value of about 5.85, inoculating with a prepared bacterial culture of *Bacillus mesentericus*, incubating in the presence of oxygen for a period sufficient to yield a desired enzymic concentration, and then separating bacteria and liquid, said liquid containing the starch liquefying enzymes.

2. A process for the preparation of a starch liquefying enzymic material which comprises preparing a nutrient medium from a cereal meal, sterilizing, adjusting the acidity prior to inoculation to a pH value of about 5.85, inoculating shallow layers of the medium with a prepared bacterial culture of *Bacillus mesentericus*, incubating at a temperature of about 30° C. in the presence of oxygen for a period sufficient to yield a desired enzymic concentration, and then separating bacteria and liquid, said liquid containing the starch liquefying enzymes.

3. A process for the preparation of a starch liquefying enzymic material which comprises preparing a nutrient medium by mineral acid digestion of a cereal meal, neutralizing, sterilizing, adjusting the acidity prior to inoculation to a pH value of about 5.85, inoculating a shallow layer of the medium having a Balling of about 10.4° with a prepared bacterial culture of *Bacillus mesentericus*, incubating at a temperature of about 30° C. in the presence of oxygen for several days, and separating bacteria and liquid, said liquid containing the starch liquefying enzymes.

4. A process for the preparation of a starch liquefying enzymic material which comprises preparing a nutrient medium by mineral acid digestion of soy bean meal, neutralizing to a neutral reaction with litmus, sterilizing, adjusting prior to inoculation the pH value to about 5.85, inoculating a shallow layer having a depth of about 0.5 centimeter of the medium having a Balling of about 10.4° with a prepared bacterial culture of *Bacillus mesentericus*, incubating at about 30° C. in the presence of oxygen for a period of about 72 hours, and separating bacteria and liquid, said liquid containing the starch liquefying enzymes.

5. A process for the preparation of a starch liquefying enzymic material which comprises preparing a nutrient medium by sulfuric acid digestion of soy bean meal under a steam pressure of about 20 lbs. per sq. inch for about 4 hours, neutralizing while hot to neutral reaction with litmus, filtering while still hot, adjusting the pH value to about 5.85, inoculating shallow layers of the thus prepared medium having a Balling of about 10.4° and a depth of about 0.5 centimeter with a bacterial culture of *Bacillus mesentericus*, incubating at about 30° C. in the presence of oxygen for a period of about 72 hours, and separating bacteria and liquid, said liquid containing the starch liquefying enzymes.

6. A process for the preparation of a starch liquefying enzymic material which comprises preparing a nutrient medium by sulfuric acid digestion of soy bean meal under a steam pressure of about 20 lbs. per sq. inch for about 4 hours, neutralizing while hot to neutral reaction with litmus, filtering while still hot, sterilizing, adjusting the pH value to about 5.85, inoculating shallow layers of the thus prepared medium having a Balling of about 10.4° and a depth of about 0.5 cm. with a bacterial culture of *Bacillus mesentericus* in an amount of about 5% of the final volume, incubating at a temperature of about 30° C. in the presence of oxygen for a period of about 72 hours, and separating bacteria and liquid, said liquid containing the starch liquefying enzymes.

7. A process for the preparation of a starch liquefying enzymic material which comprises preparing a nutrient medium from a cereal meal, adjusting the acidity of said medium prior to inoculation to a pH value of about 5.85, inoculating with a bacterial culture of *Bacillus mesentericus*, and incubating for a period sufficient to yield a desired enzymic concentration.

ALFRED SCHULTZ.
LAWRENCE ATKIN.
CHARLES N. FREY.